US008564421B2

(12) United States Patent
Ferringo et al.

(10) Patent No.: US 8,564,421 B2
(45) Date of Patent: Oct. 22, 2013

(54) METHOD AND APPARATUS FOR GENERATING AN AUDIO NOTIFICATION FILE

(75) Inventors: Bradley Shayne Ferringo, Marco Island, FL (US); Gregory Jason Fields, Waterloo (CA); Susan Tammy teWinkel, Guelph (CA); John Patrick Grenn, Waterloo (CA); Joseph Leonard Dvorak, Hampshire, IL (US); Michael Williams Suman, Chicago, IL (US)

(73) Assignee: BlackBerry Limited, Waterloo (CA)

( * ) Notice: Subject to any disclaimer, the term of this patent is extended or adjusted under 35 U.S.C. 154(b) by 427 days.

(21) Appl. No.: 12/886,896

(22) Filed: Sep. 21, 2010

(65) Prior Publication Data
US 2011/0267180 A1 Nov. 3, 2011

Related U.S. Application Data

(60) Provisional application No. 61/329,920, filed on Apr. 30, 2010.

(51) Int. Cl.
*G08B 3/10* (2006.01)
(52) U.S. Cl.
USPC ..................... 340/384.5; 340/384.1
(58) Field of Classification Search
None
See application file for complete search history.

(56) References Cited

U.S. PATENT DOCUMENTS

2007/0297292 A1* 12/2007 Kraft et al. .................. 368/73
2010/0022279 A1* 1/2010 Hoberg et al. ............... 455/567

FOREIGN PATENT DOCUMENTS

WO 2007148180 12/2007

OTHER PUBLICATIONS

Ronkainen, "Earcons in Motion—Defining Language for an Intelligent Mobile Device", Proceedings of the 7th International Conference on Auditory Display, Jul. 29-Aug. s, 2001, Helsinki University of Technology, Laboratory of Acoustics and Audio Signal Processing, Telecommunications Software and Multimedia Library, pp. 126-131.*
European Search Report dated Mar. 7, 2011. In corresponding application No. 10177948.6.
Sami Ronkaine—Earcons in Motion—Defining Language for an Intelligent Mobile Device; Proceedings of the 7th International Conference on Auditory Display: Jul. 29 Aug. 1, 2001, Helsinki University of Technology, Laboratory of Acoustics and Audio Signal Processing, Telecommunications software and multimedia laboratory, ESPOO, Jul. 29, 2001, pp. 126-131, XP002624760, ISBN: 978-951-22-5521-4* p. 126, right -hand column, line 39- line 45* p. 127, right-hand column, line 3-line 51*.
Ellen C. Haas Et al. "Designing urgency into auditory warnings using pitch, speed and loudness", Computing and control engineering, IET Publishing group, Stevenage, GB, Aug. 1, 1996, pp. 193-198, IP002565614, ISSN:0956-3385.

* cited by examiner

*Primary Examiner* — Travis Hunnings
(74) *Attorney, Agent, or Firm* — Novak Druce Connolly Bove + Quigg LLP

(57) ABSTRACT

A method and apparatus for generating an audio notification file for a computing device are provided. A first audio file associated with a first mental state is selected as a first section of the audio notification file. The audio notification file enabled for storage in a memory. The audio notification file is further enabled for processing by a processing unit to control a speaker. A final state of the audio notification file is determined, the final state designated as a final section of the audio notification file, the final state associated with a second mental state. At least one intermediate section of the audio notification file is generated, between the first section and the second section, by morphing the first audio file to the final state by processing the first audio file using a digital signal processor.

31 Claims, 10 Drawing Sheets

METHOD AND APPARATUS FOR GENERATING AN AUDIO NOTIFICATION FILE

FIELD

The specification relates generally to digital signal processing, and specifically to a method and apparatus for generating an audio notification file.

BACKGROUND

Technology for providing notifications at computing devices, for example as an alarm and/or in response to receiving a message and/or the like, is currently deficient.

BRIEF DESCRIPTIONS OF THE DRAWINGS

Implementations are described with reference to the following figures, in which.

DETAILED DESCRIPTION OF THE IMPLEMENTATIONS

Figure 1:
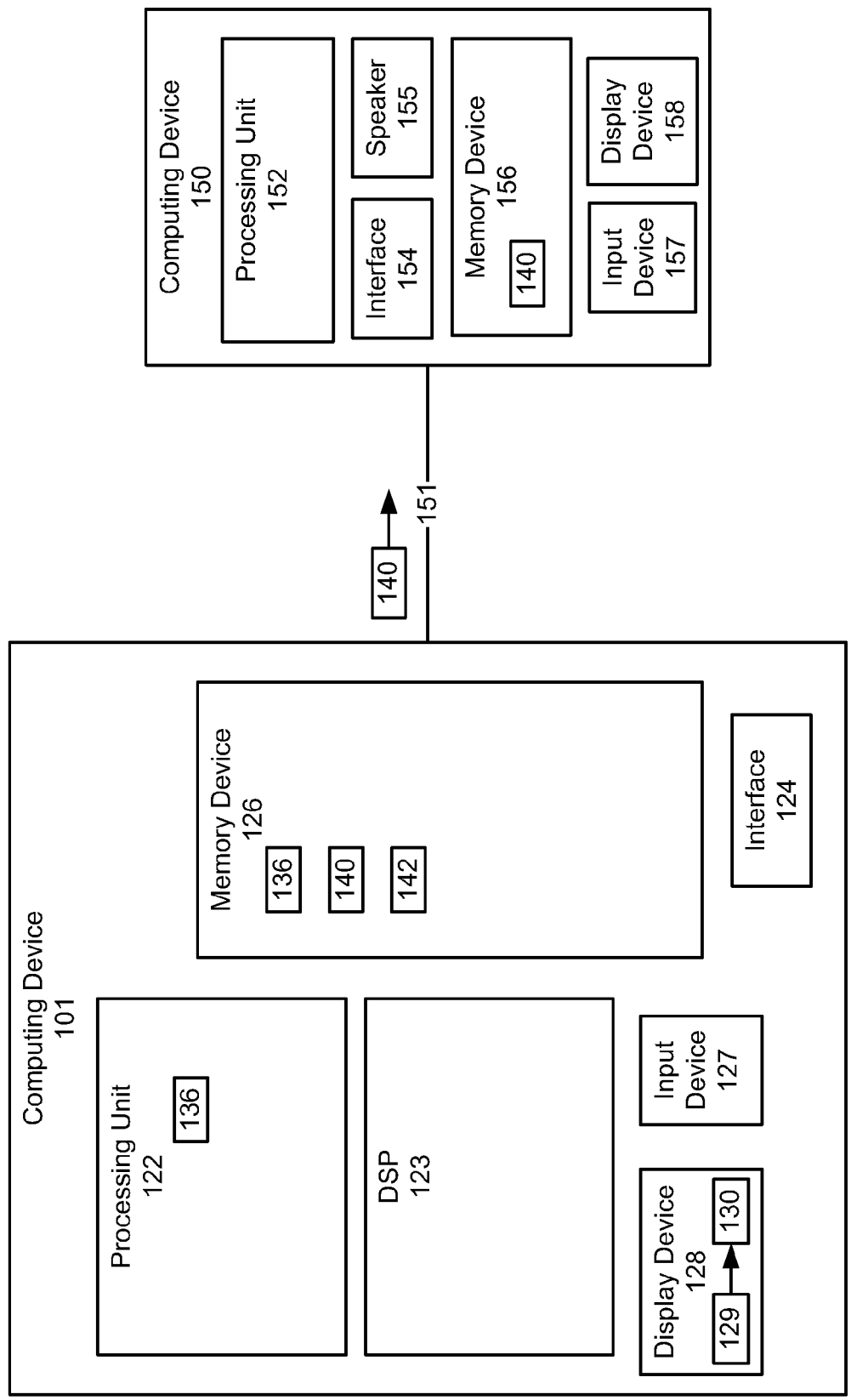
FIG. 1 depicts a block diagram of a computing device for generating an audio notification file, according to non-limiting implementations.

A first aspect of the specification provides a method for generating an audio notification file for a computing device comprising a processing unit interconnected with a memory and a speaker. The method comprises: selecting a first audio file associated with a first mental state as a first section of the audio notification file, the audio notification file enabled for storage in the memory, the audio notification file further enabled for processing by the processing unit to control the speaker; determining a final state of the audio notification file, the final state designated as a final section of the audio notification file, the final state associated with a second mental state; and, generating at least one intermediate section of the audio notification file, between the first section and the second section, by morphing the first audio file to the final state by processing the first audio file using a digital signal processor (DSP).

Generating the at least one intermediate section of the audio notification file can comprise: processing the first audio file using the DSP until the first audio file has morphed into the final state; and, as the first audio file is processed using the DSP, storing intermediate states of the first audio file in the audio notification file as the at least one intermediate section such that a transition from the first section to the final section in the audio notification file is audibly smooth when the audio notification file is played.

Determining the final state of the audio notification file can comprise selecting a second audio file associated with the second mental state as the final state. Generating the at least one intermediate section of the audio notification file can comprise: processing the first audio file and the second audio file to cause the first audio file to morph into the second audio file using the DSP; and, as the first audio file and the second audio file are processed using the DSP, storing intermediate states of the first audio file morphing into the second audio file in the audio notification file as the at least one intermediate section such that a transition from the first section to the final section in the audio notification file is audibly smooth when the audio notification file is played. The method can further comprise: selecting at least a third audio file associated with an intermediate mental state, wherein the processing the first audio file and the second audio file to cause the first audio file to morph into the second audio file can comprise processing at least the third audio file to cause the first audio file to first morph into the third audio file before morphing into the second audio file, and wherein the storing the intermediate states can comprise: storing first intermediate states of the first audio file morphing into the third audio file; and storing second intermediate states of the third audio file morphing into the second audio file.

The method can further comprise storing the audio notification file in the memory of the computing device. The method can further comprise determining, at the computing device, that a notification is to be provided and in response processing the audio notification file at the processing unit to control the speaker to output sound based on the audio notification file.

Selecting the first audio file, the storing the first audio file, the determining a final state of the audio notification file, and the generating the at least one intermediate section of the audio notification file can all occur automatically at the processing unit of the computing device when the processing unit determines that a notification is to be provided by playing the audio notification file.

The method can further comprise adding markers to the audio notification file to mark transitions between each of the sections of the audio notification file. Each of the sections can be associated with a given level of urgency, and the method can further comprise: storing the audio notification file in the memory of the computing device; determining that at least one of the sections is associated with a level of urgency of a given notification; selecting the at least one of the sections based on the markers; and playing the at least one of the sections associated with the level of urgency in response to determining that the given notification is to be provided. The method can further comprise determining the level of urgency based on a context of the computing device via at least one of a calendar database associated with the computing device, a location sensing device, and at least one sensor. The method can further comprise receiving a message from a second computing device, the message comprising indicating the level of urgency, and determining that the given notification is to be provided in response to the receiving.

The first mental state can comprise a sleeping state. The second mental state can comprise a waking state.

The first audio file can comprise at least one of a polyphonic file and a music file and the final state can comprise a target wave state.

The method can further comprise mixing at least one additional audio file into the audio notification file by at least one of: cross-fading the at least one additional audio file with at least one of the first audio file and the final state; mixing the at least one additional audio file for playback in parallel with at least one of the first audio file and the final state; adding the at least one additional audio file for playback in series with at least one of the first audio file and the final state; appending the at least one additional audio file to at least one of the first audio file and the final state; and, mixing the at least one additional audio file to the audio notification file for staggered playback with at least one of the first audio file and the final state.

At least one of the first audio file and the final state can be selected from a library associated with a playback device upon which the audio notification file is to be played.

Morphing the first audio file to the final state can comprise at least one of: morphing the first audio file to the final state over a given period of time; evolving the first audio file to the final state; increasing a first set of frequencies in the first audio file over the given period of time; decreasing a second set of frequencies in the first audio file over the given period of time; changing a tone of a third set of frequencies in the first audio file over the given period of time; changing an urgency level in a fourth set of frequencies in the first audio file over the given period of time; changing a speed of the first audio file over the given period of time; and, changing a first instrument associated with the first audio file to a second instrument over the given period of time.

A second aspect of the specification provides a computing device for generating an audio notification file. The computing device comprises a processing unit interconnected with a memory. The processing unit is enabled to: select a first audio file associated with a first mental state as a first section of the audio notification file, the audio notification file enabled for storage in a memory of playback device, the audio notification file further enabled for processing by the play back device to control a speaker; determine a final state of the audio notification file, the final state designated as a final section of the audio notification file, the final state associated with a second mental state; and, generate at least one intermediate section of the audio notification file, between the first section and the second section, by morphing the first audio file to the final state by processing the first audio file using a digital signal processor (DSP).

The processing unit can be further enabled to generate the at least one intermediate section of the audio notification file by: processing the first audio file using the DSP until the first audio file has morphed into the final state; and, as the first audio file is processed using the DSP, storing intermediate states of the first audio file in the audio notification file as the at least one intermediate section such that a transition from the first section to the final section in the audio notification file is audibly smooth when the audio notification file is played.

The processing unit can be further enabled to determine the final state of the audio notification file by selecting a second audio file associated with the second mental state as the final state, and wherein the processing unit can be further enabled to generate the at least one intermediate section of the audio notification file by: processing the first audio file and the second audio file to cause the first audio file to morph into the second audio file using the DSP; and, as the first audio file and the second audio file are processed using the DSP, storing intermediate states of the first audio file morphing into the second audio file in the audio notification file as the at least one intermediate section such that a transition from the first section to the final section in the audio notification file is audibly smooth when the audio notification file is played.

The processing unit can be further enabled to: select at least a third audio file associated with an intermediate mental state, wherein the processing unit can be further enabled to process the first audio file and the second audio file to cause the first audio file to morph into the second audio file by processing at least the third audio file to cause the first audio file to first morph into the third audio file before morphing into the second audio file, and wherein the processing unit can be further enabled to store the intermediate states by: storing first intermediate states of the first audio file morphing into the third audio file; and storing second intermediate states of the third audio file morphing into the second audio file.

The processing unit can be further enabled to store the audio notification file in the memory of the computing device.

The computing device of can further comprise the playback device and wherein the processing unit can be further enabled to determine that a notification is to be provided and in response processing the audio notification file at the processing unit to control the speaker to output sound based on the audio notification file.

The computing device can further comprise the playback device, and wherein the processing unit can be further enabled to select the first audio file, store the first audio file, determine a final state of the audio notification file, and generate the at least one intermediate section of the audio notification file automatically at the processing unit of the computing device when the processing unit determines that a notification is to be provided by playing the audio notification file.

The processing unit can be further enabled to add markers to the audio notification file to mark transitions between each the section of the audio notification file.

The computing device can further comprise the playback device, and wherein each of the sections are associated with a given level of urgency, wherein the processing unit can be further enabled to: store the audio notification file in the memory of the computing device; determine that at least one of the sections is associated with a level of urgency of a given notification; select the at least one of the sections based on the markers; and play the at least one of the sections associated with the level of urgency in response to determining that the given notification is to be provided. The processing unit can be further enabled to determine the level of urgency based on a context of the computing device via at least one of a calendar database associated with the computing device, a location sensing device, and at least one sensor. The processing unit can be further enabled to receive a message from a second computing device, the message comprising indicating the level of urgency, and determine that the given notification is to be provided in response to the receiving.

The first mental state can comprise a sleeping state. The second mental state can comprise a waking state.

The first audio file can comprise at least one of a polyphonic file and a music file and the final state can comprise a target wave state.

The processing unit can be further enabled to mix at least one additional audio file into the audio notification file by at least one of: cross-fading the at least one additional audio file with at least one of the first audio file and the final state; mixing the at least one additional audio file for playback in parallel with at least one of the first audio file and the final state; adding the at least one additional audio file for playback in series with at least one of the first audio file and the final state; appending the at least one additional audio file to at least one of the first audio file and the final state; and, mixing the at least one additional audio file with the audio notification file for staggered playback with at least one of the first audio file and the final state.

At least one of the first audio file and the final state can be selected from a library associated with the playback device.

The processing unit can be further enabled to morph the first audio file to the final state by at least one of: morphing the first audio file to the final state over a given period of time; evolving the first audio file to the final state; increasing a first set of frequencies in the first audio file over the given period of time; decreasing a second set of frequencies in the first audio file over the given period of time; changing a tone of a third set of frequencies in the first audio file over the given period of time; changing an urgency level in a fourth set of frequencies in the first audio file over the given period of time; changing a speed of the first audio file over the given period of time; and, changing a first instrument associated with the first audio file to a second instrument over the given period of time.

A third aspect of the specification provides a computer program product, comprising a computer usable medium having a computer readable program code adapted to be executed to implement a method for generating an audio notification file for a computing device comprising a processing unit interconnected with a memory and a speaker, the method comprising: selecting a first audio file associated with a first mental state as a first section of the audio notification file, the audio notification file enabled for storage in the memory, the audio notification file further enabled for processing by the processing unit to control the speaker; determining a final state of the audio notification file, the final state designated as a final section of the audio notification file, the final state associated with a second mental state; and, generating at least one intermediate section of the audio notification file, between the first section and the second section, by morphing the first audio file to the final state by processing the first audio file using a digital signal processor (DSP).

FIG. 1 depicts a computing device 101 for generating an audio notification file 140, according to non-limiting implementations. Computing device 101, which will also be referred to hereafter as device 101, comprises a processing unit 122 interconnected with a digital signal processor (DSP) 123, a communication interface 124 (alternatively referred to hereafter as interface 124) and a memory device 126 (alternatively referred to hereafter as memory 126), for example via a computing bus (not depicted). Computing device 101 can optionally comprise an input device 127 and/or a display device. Alternatively, input device 127 and/or display device 128 can be external to computing device 101, though interconnected with processing unit 122 via any suitable connection. Furthermore, while DSP 123 is depicted as external to processing unit, in other implementations, processing unit 122 and DSP 123 can be combined in a single unit.

Device 101 further comprises an application 136 for generating an audio notification file 140 from at least a first audio file 142 stored in memory 126. Application 136 can be stored in memory 126 and processed by processing unit 122. In particular processing of application 136 enables device 101 to generate audio notification file 140 by processing first audio file 142 using DSP 123, as will be described below.

It is further appreciated that in some implementations device 101 is in communication with another computing device 150 via a link 151, which can be wired or wireless as desired. Computing device 150 comprises a processing unit 152 interconnected with a communication interface 154, a memory device 156 and a speaker 155, as well as an input device 157 and a display device 159, input device 157 and display device 159 being internal or external to computing device 150 as desired. In any event, in these implementations, device 101 is enabled to transmit audio notification file 140 to computing device 150 via link 151, for storage in memory device 156 and processing by processing unit 152 when a notification is to be made at computing device 150, such that audio notification file 140 is played via speaker 155. The transmission of audio notification file 140 can occur when requested by computing device 150 (e.g. during an update of computing device 150 and/or when audio notification file 140 is specifically requested) and/or during a provisioning of computing device 150.

In general, device 101 comprises any suitable computing device for processing application 136, including but not limited to any suitable combination of servers, personal computing devices, laptop computing devices, portable computing device, mobile electronic devices, PDAs (personal digital assistants), cellphones, smartphones, an alarm device, a playback device and the like. Other suitable computing devices are within the scope of present implementations.

Processing unit 122 comprises any suitable processor, or combination of processors, including but not limited to a microprocessor, a central processing unit (CPU) and the like. Other suitable processing units are within the scope of present implementations.

DSP 123 comprises any suitable digital signal processor, or combination of digital signal processors. In particular, DSP 123 is enabled to process audio files including but not limited to first audio file 142. For example, DSP 123 can be enabled to cause first audio file 142 to morph and/or evolve from a first state to a final state, each state associated with a different mental state. Specifically, DSP 123 can be enabled to cause first audio file to morph and/or evolve from a first state to a final state through a seamless audio transition over a given period of time, and store the resulting data as audio notification file 140.

Communication interface 124 comprises any suitable communication interface, or combination of communication interfaces. In particular communication interface 124 is enabled to communicate with remote computing device 150 via a network (not depicted) and/or link 151 to at least one of receive first audio file 142 and/or transmit audio notification file 140, the network being wired and/or wireless as desired. Accordingly, communication interface 124 (which will also be referred to as interface 124 hereafter) is enabled to communicate according to any suitable protocol which is compatible with the network, including but not limited to wired protocols, USB (universal serial bus) protocols, serial cable protocols, wireless protocols, cell-phone protocols, wireless data protocols, Bluetooth protocols, NFC (near field communication) protocols and/or a combination, or the like. In some implementations, interface 124 can be enabled to communicate with remote computing devices (e.g. servers, other computing devices etc.), via any suitable communication network according to any suitable protocol, including but not limited to packet based protocols, Internet protocols, analog protocols, PSTN (public switched telephone network) protocols, WiFi protocols, WiMax protocols and the like, and/or a combination. Other suitable communication interfaces and/or protocols are within the scope of present implementations.

Memory device 126 can comprise any suitable memory device, including but not limited to any suitable one of, or combination of, volatile memory, non-volatile memory, random access memory (RAM), read-only memory (ROM), hard drive, optical drive, flash memory, magnetic computer storage devices (e.g. hard disks, floppy disks, and magnetic tape), optical discs, and the like. Other suitable memory devices are within the scope of present implementations. In particular, memory device 126 is enabled to store application 136, audio notification file 140 and first audio file 142.

Input device 127 is generally enabled to receive input data, and can comprise any suitable combination of input devices, including but not limited to a keyboard, a keypad, a pointing device, a mouse, a track wheel, a trackball, a touchpad, a touch screen and the like. Other suitable input devices are within the scope of present implementations.

Display device 128 comprises circuitry 129 for generating representations of data, for example a representation 130 of application 136. Display device 128 can include any suitable one of or combination of CRT (cathode ray tube) and/or flat panel displays (e.g. LCD (liquid crystal display), plasma, OLED (organic light emitting diode), capacitive or resistive touchscreens, and the like). Circuitry 129 can include any suitable combination of circuitry for controlling the CRT and/or flat panel displays etc., including but not limited to display buffers, transistors, electron beam controllers, LCD cells, plasmas cells, phosphors etc. In particular, display device 128 and circuitry 129 can be controlled by processing unit 122 to generate representation 130.

In general, device 150 comprises any suitable computing device for processing audio notification file 140, including but not limited to any suitable combination of servers, personal computing devices, laptop computing devices, portable computing device, mobile electronic devices, PDAs (personal digital assistants), cellphones, smartphones, an alarm device, a playback device and the like. Other suitable computing devices are within the scope of present implementations. Furthermore, processing unit 152, interface 154, memory device 156, input device 157 and display device 158 can be respectively similar to processing unit 122, interface 124, memory device 126, input device 127, and display device 128 as described above. Speaker 155 can be any suitable speaker.

Link 151 can be any suitable wired or wireless link as desired, including but not limited to any suitable wireless network (1X, UMTS (Universal Mobile Telecommunications System), CDMA (code division multiple access), GSM (Global System for Mobile communications), EVDO (Evolution-Data Optimized), HSPA (High Speed Packet Access), 3GPP ($3^{rd}$ Generation Partnership Project), 3G ($3^{rd}$ Generation), EDGE (Enhanced Data rates for GSM Evolution), or the like), in combination with any suitable combination of wired or wireless networks as desired, including but not limited to a packet based network, the Internet, an analog network, the PSTN (public switched telephone network), a WiFi network, a WiMax network and the like.

Figure 2:
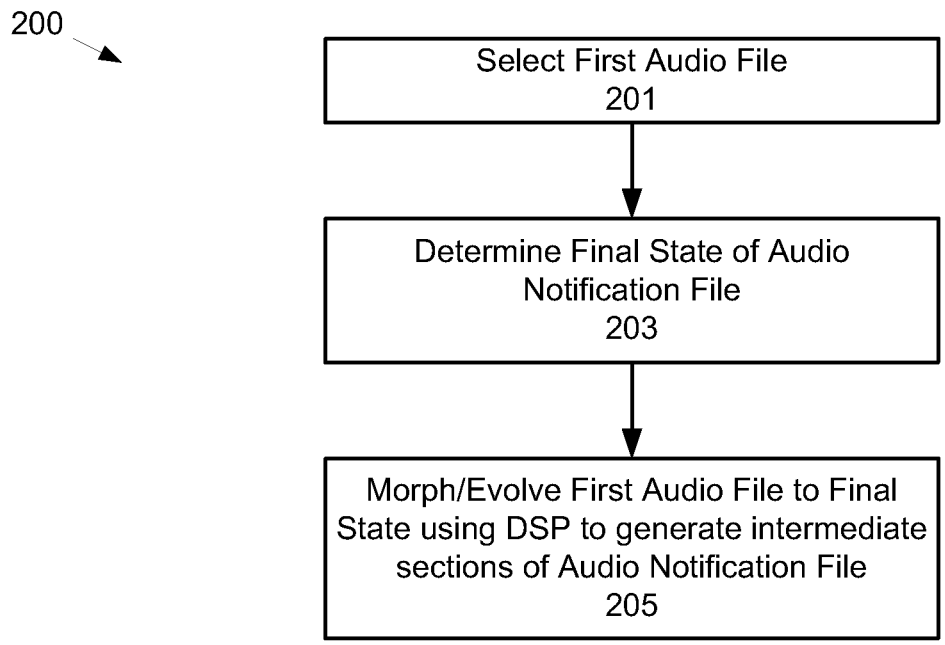
FIG. 2 depicts a flow chart of a method for generating an audio notification file, according to non-limiting implementations.

Attention is now directed to FIG. 2 which depicts a method 200 for generating an audio notification file for a computing device comprising a processing unit interconnected with a memory and a speaker. In order to assist in the explanation of method 200, it will be assumed that method 200 is performed using computing device 101. Furthermore, the following discussion of method 200 will lead to a further understanding of computing device 101 and its various components. However, it is to be appreciated that computing device 101 and/or method 200 can be varied, and need not work exactly as discussed herein in conjunction with each other, and that such variations are within the scope of present implementations.

It is appreciated that method 200 can be initiated whenever it is desired to generate audio notification file 140. Further, it is appreciated that method 200 can be initiated any given number of times, using any suitable audio file (e.g. such as first audio file 142) as an initial input to produce any suitable number of audio notification files.

Figure 3:
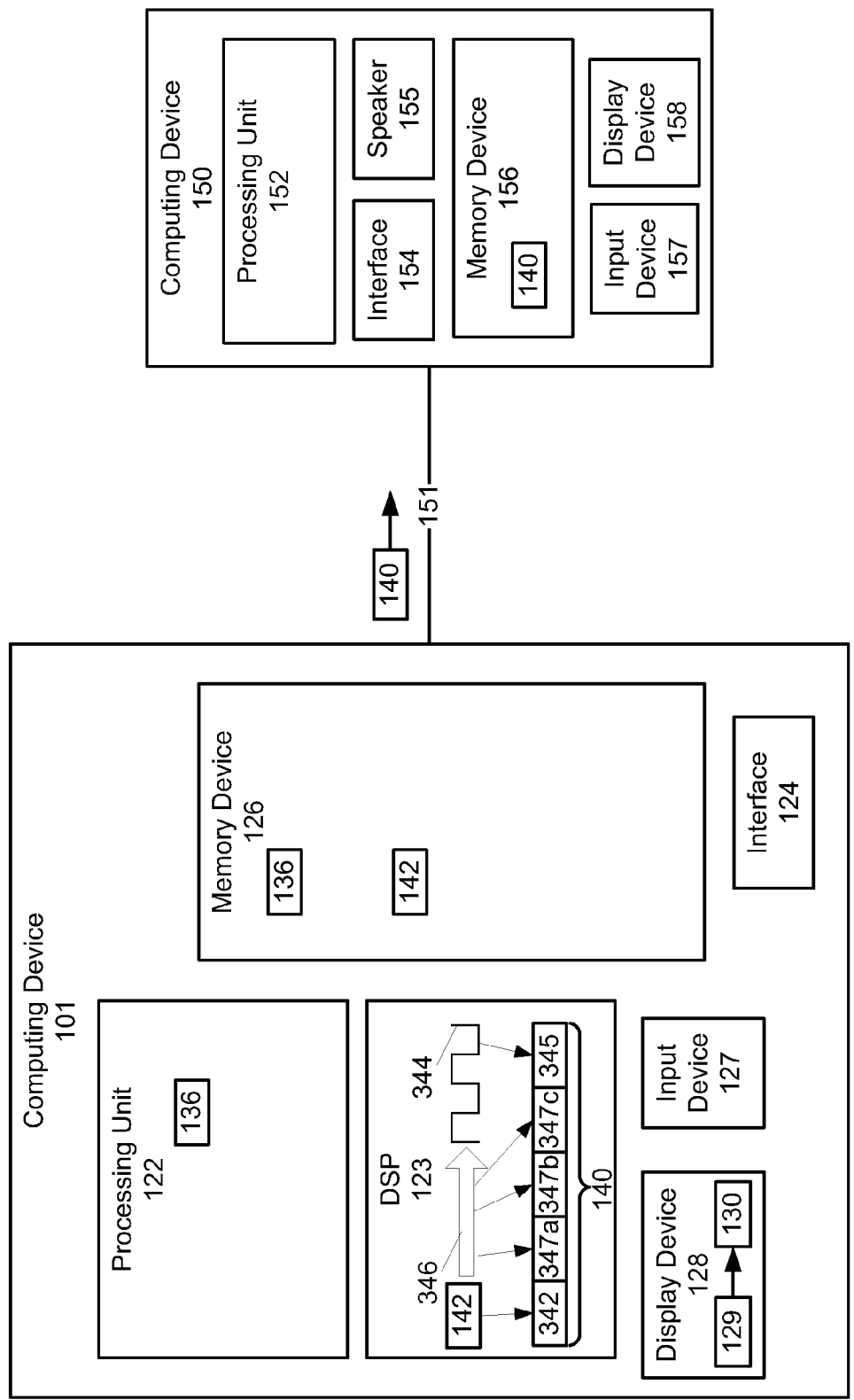
FIGS. 3 to 6 depict a block diagrams of computing devices for generating audio notification files, according to non-limiting implementations.

It is further appreciated that while FIG. 1 depicts memory 126 as storing audio notification file 140 and first audio file 142, when method 200 initiates, audio notification file 140 has not yet been generated, for example as in FIG. 3 (substantially similar to FIG. 1, with like elements having like numbers).

Hence, once method 200 is initiated, at step 201, first audio file 142 is selected as a first section 342 of audio notification file 140. Selection of first audio file 142 can occur by receiving input from input device 127 indicative that first audio file 142 has been selected. Alternatively, first audio file 142 can be selected automatically and/or randomly by processing unit 122 and/or DSP 123. It is appreciated that first audio file 142 is associated with a first mental state.

In any event, as depicted in FIG. 3, first audio file 142 is selected by loading first audio file 142 into DSP 123.

At step 203, and with further reference to FIG. 3, a final state 344 of audio notification file 140 is determined. It is appreciated that final state 344 is designated as a final section 345 of audio notification file 140 and that final state 342 is associated with a second mental state. In depicted non-limiting implementations, final state 344 comprises a square wave, however final state 344 can be any suitable final state including but not limited to a target wave state such as any other suitable type of wave (e.g. sinusoidal or the like), combinations of waves, another audio file (as described below with reference to FIGS. 4 and 5), a combination of audio files, or a combination thereof.

In some implementations, at least one of first audio file 142 and final state 344 can be selected from a library associated with a playback device upon which audio notification file 140 is to be played, such as computing device 150. For example, files that are integrated, mixed etc. into audio notification file 140 can be selected from a user library associated with computing device 150.

At step 205, first audio file 142 is smoothly morphed to final state 344 by processing first audio file 142 using DSP 130, for example a morphing effect function at DSP 130, as represented by arrow 346. As first audio file 142 is being morphed any suitable number of intermediate sections 347*a*, 347*b*, 347*c* (collectively intermediate sections 347 and generically an intermediate section 347) of audio notification file 140 are generated. While three intermediate sections 347 of audio notification file 140 are depicted in FIG. 3, the number of intermediate sections 347 is not to be considered limiting and can include at least one intermediate section 347. Furthermore, it is appreciated that each intermediate section 437 corresponds to an intermediate state of the morphing process. It is further appreciated that, in some implementations, intermediate states of first audio file 142 are stored in audio notification file 140 as intermediate sections 347 such that a transition from first section 342 to final section 345 in audio notification file 140 is audibly smooth when audio notification file 140 is played, for example at computing device 150.

In other words, DSP 130 smoothly morphs first audio file 142 into final state 344 to generate intermediate sections 347 of audio notification file 140, such that a transition from first section 142 to final section 345 is audibly smooth when audio notification file 140 is played/processed, for example at computing device 150, or any other suitable computing device.

Morphing first audio file 142 to final state 344 can include, but is not limited to: morphing first audio file 142 to final state 144 over a given period of time; evolving first audio file 142 to final state 144; increasing a first set of frequencies in first audio file 142 over the given period of time; decreasing a second set of frequencies in first audio file 142 over the given period of time; changing a tone of a third set of frequencies in first audio file 142 over the given period of time; changing an urgency level in a fourth set of frequencies in first audio file 142 over the given period of time; changing a speed of first audio file 142 over the given period of time; and changing a first instrument associated with first audio file 142 to a second instrument over the given period of time. Hence, as first audio file 142 morphs to final state 344 in audio notification file 140, a set of frequencies, speed, tone, instrument etc. can be smoothly altered so that during playback of audio notification file 140, the urgency level of the audio notification file 140 becomes more urgent.

Furthermore, audio notification file 140 can be any suitable length, such that when processed/played, sounds from (e.g.) speaker 155 occur for a correspondingly suitable length of time. For example, when audio notification file 140 comprises an alarm for transitioning a user from a first mental state to a second mental state, the length of time that audio notification file 140 can be a length of time for gently transitioning the user between mental states, as will be described below.

Once audio notification file 140 is generated, audio notification file 140 can be transmitted to computing device 150, or any other suitable playback device or computing device, for storage and playing/processing when a notification is to be played. For example, at computing device 150, it can be determined that at a notification is to be provided (e.g. an alarm) and in response, processing unit 152 processed audio notification file 140 to control speaker 155 to output sound based on audio notification file 140.

Figure 4:
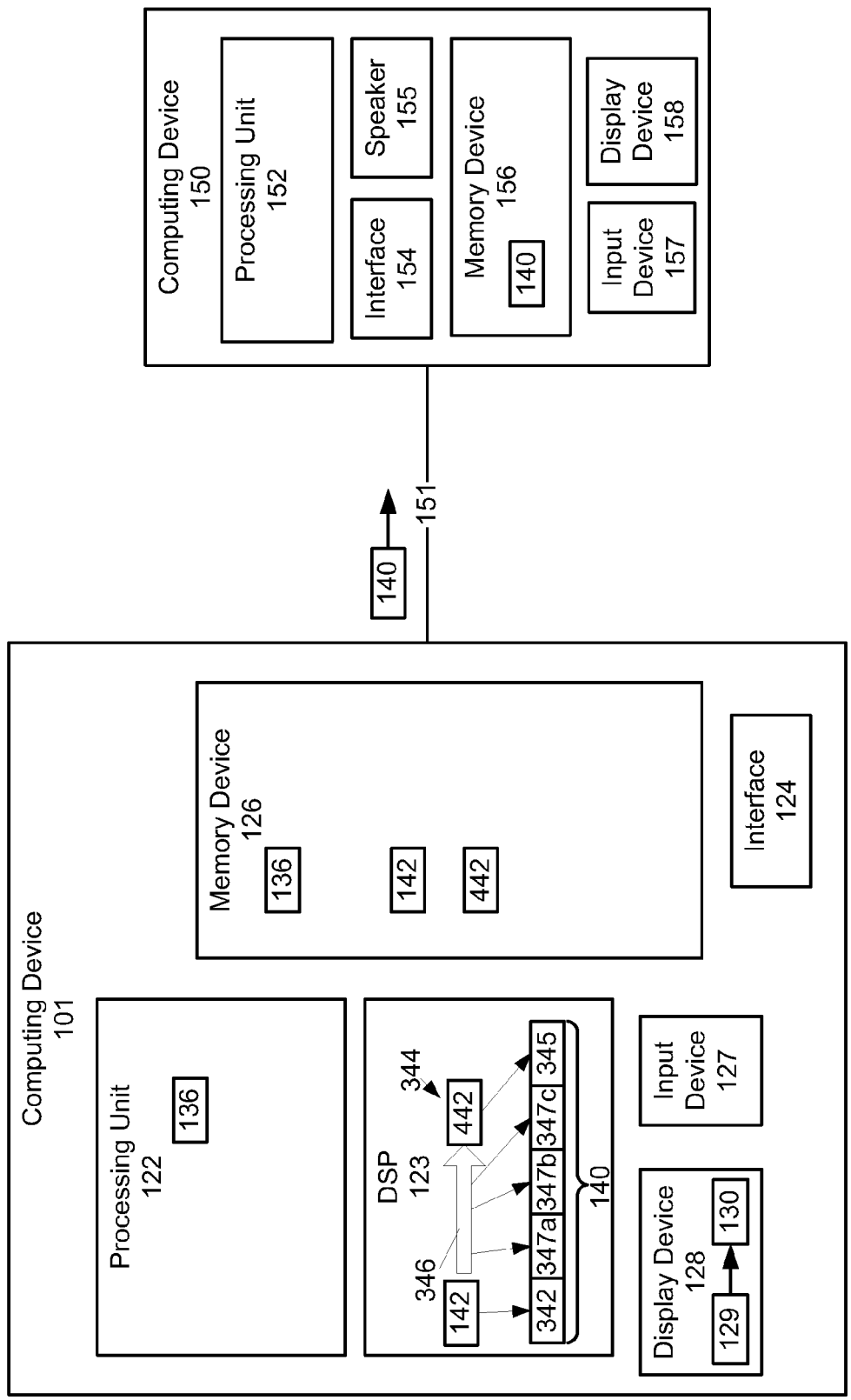

Attention is now directed to FIG. 4, which is substantially similar to FIG. 3 with like elements having like numbers, however in these implementations at least a second audio file 442 is stored in memory device 126, second audio file 442 associated with the second mental state. In these implementations, second audio file 442 is designated as final state 442 such that determining final state 342 of audio notification file 140 at step 203 of method 200 comprises selecting second audio file 442, and generating intermediate sections 347 of audio notification file 140 comprises processing first audio file 142 and second audio file 442 to cause first audio file 142 to morph into second audio file 442 using DSP 123. Further, as first audio file 142 and second audio file 442 are being processed using DSP 123, intermediate states are stored as intermediate sections 347, intermediate states being the intermediate states between first audio file 142 morphing into second audio file 442. In any event, the intermediate states are stored as intermediate sections 347 in audio notification file 140 such that a transition from first section 342 to final section 345 in audio notification file 140 is audibly smooth when audio notification file 140 is played.

Figure 5:
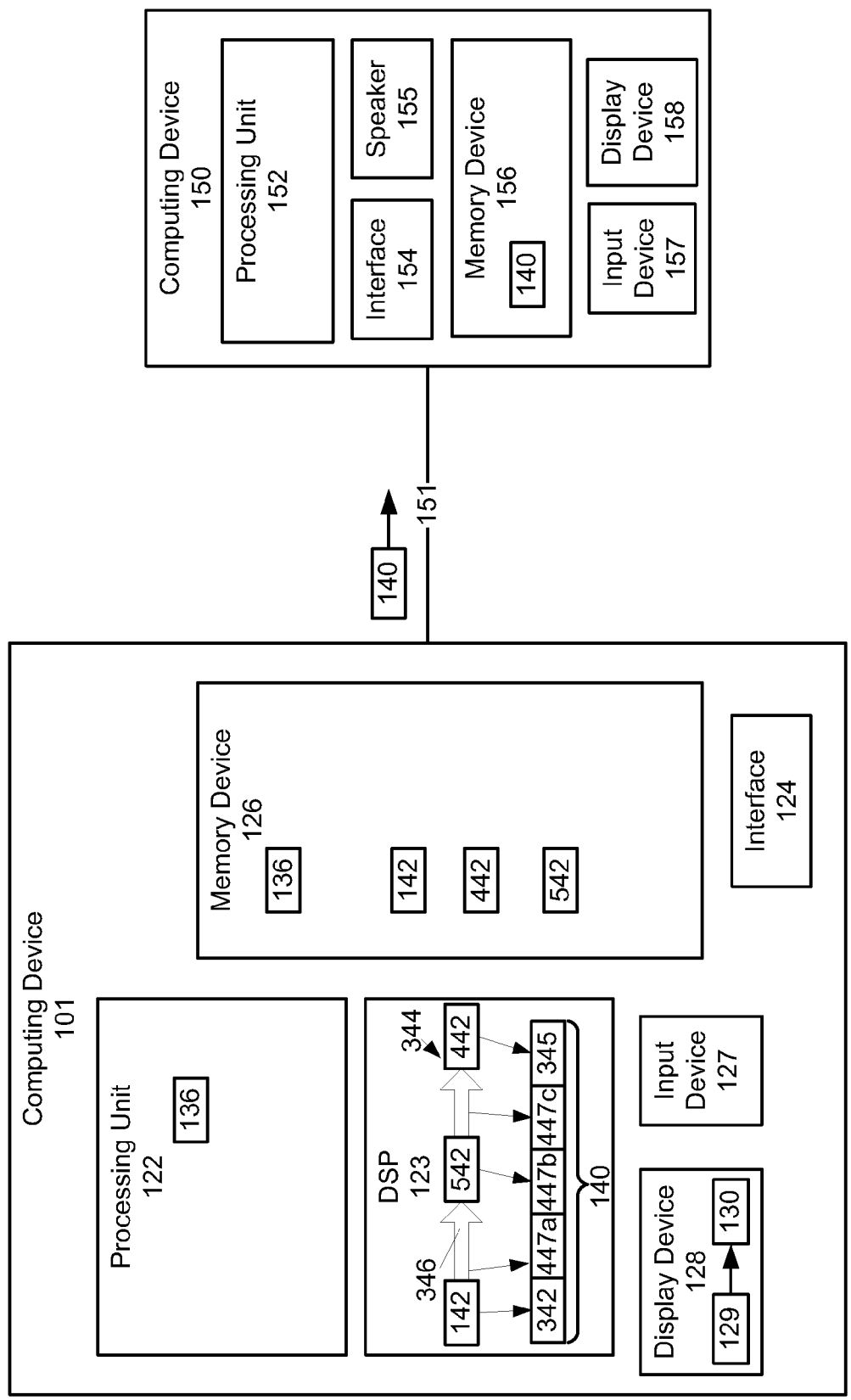

Attention is now directed to FIG. 5, which is substantially similar to FIG. 4 with like elements having like numbers, however in these implementations at least a third audio file 542 is stored in memory device 126, third audio file 542 associated with an intermediate mental state. In these implementations, processing first audio file 142 and second audio file 442 to cause first audio file 142 to morph into second audio file 442 comprises processing third audio file 542 to cause first audio file 142 to first morph into third audio file 542 before morphing into second audio file 442. Furthermore, storing intermediate states of the morphing process comprises storing first intermediate states of first audio file 142 morphing into third audio file 542 as at least one intermediate section 447a, storing at least third audio file 542 as a next intermediate section 447b and storing final intermediate states of third audio file 542 morphing into second audio file 442 as at least one final intermediate section 447c, in addition to storing first audio file 142 as first section 342 and second audio file 442 as final section 345.

Indeed, in some implementations, memory device 126 can comprise a library of any suitable number of audio files similar to first audio file 142, second audio file 442 and/or third audio file 542, and DSP 123 can be enabled to use any number of the audio files in the library to generate audio notification file 140. Each audio file chosen by DSP 123 to be incorporated into audio notification file 140 can be chosen via automatic analysis of each file to choose a first file and a last file, each associated with the appropriate mental state (e.g. a first file comprising smooth soothing sounds and a last file comprising abrupt jarring sounds) and/or each audio file in the library can be associated with tag indicating the mental state association, and/or the audio files can be organized into groups associated with appropriate mental states.

In any event, notification content (e.g. audio) on mobile devices (or any other computing device) is often jarring, annoying, and bothersome to the user and to others. Furthermore, the content is predominantly static in nature, which means that a transition between a psychological/mental state and/or environment prior to the notification and a psychological/mental state and/or environment after the notification is sudden and jarring. While this can be addressed by providing pleasurable content (e.g. a suitable aesthetic soundscape) as the notification, such content is rarely functional and hence often fail to deliver sufficient sound language: e.g. for an alarm, the traditional electronic or mechanical bell alarm (such as a square wave alarm) provides a sudden jar from a sleeping to a waking state, but where aesthetic sounds are used, they are often deficient in their sonic attributes to generate sufficient psychological significance and wake the user.

Present implementations address this problem by providing audio notification file 140 as an alarm, audio notification file 140 comprising an evolving alert which changes over time, for example from polyphonic/music file to a square wave/alarm sound, this providing a humanistic transition between a first mental state (e.g. a sleeping state) and a second mental state (e.g. a waking state), which is the state pushed to a user by the device playing the audio notification file 140. Hence, the length of time that audio notification file 140 plays can be a length of time for providing such a humanistic transition. Such evolving alerts as provided by audio notification file 140 also provide a previously unattainable balance between desirable and functional sonic elements.

Furthermore, morphing is not limited to simply evolving from one audio file to another. Rather, it is appreciated that audio notification can comprise any suitable number of audio files which can be smoothly cross-faded there-between. Hence, audio notification file 140 can be generated from any given number of audio files. For example, a first audio file can comprise pleasing nature sounds (e.g. wind sounds, waves on a beach, "green" sounds); a second audio file comprising bird calls can be introduced, and the bird calls and pleasing nature sounds can morph into an alarm like square wave over a period of time. Hence, when an alarm notification is provided, a user first hears the pleasing sounds, which smoothly transition into the alarm like square wave; this smoothly transitions the user between a sleeping state and a waking state.

Hence, any number of audio files can be added to audio notification file 140 using any suitable technique, including but not limited to layering, adding one or more audio notification files in series, adding one or more audio notification files in series, cross fading, adding one or more audio files for staggered playback, or the like.

Furthermore, morphing can be applied to a single initial file, such as first audio file 142, to provide a range of URGENCY in audio notification file 140 to change the way that first audio file 142 is played, but not a base pattern in first audio file 142. For this example, first audio file 142 can comprise the word "hello" spoken in a quiet tone of voice, and audio notification file 140 can comprise first audio notification file 142 being repeated and altered over a given period of time to change the urgency until in final state 344 the word "hello" is being spoken in an urgent tone of voice (e.g. loud, fast, with frequencies in a higher range being emphasized/increased).

Method 200 can also comprise morphing first waveforms associated with first audio file 142 to final waveforms associated with final state 344, in audio notification file 140. In other words, first audio file 142 comprises a set of first waveforms associated with the first mental state (e.g. waveforms representing green sounds, with smooth transitions between waveforms with the set) and final state 344 comprises a set of final waveforms associated with the final mental state (e.g. a square waveform with abrupt, sudden transitions). Hence, in method 200, the smooth first waveforms morph into the square waveform over a period of time that is appreciated to not be audibly jarring to the user.

Furthermore morphing can include but is not limited to changes in volume, changes in the instrument (e.g. a pleasing sound of birds singing can morph into a similar waveform, but played by the sound of trombones, saxophones or sirens: something which is more jarring then birds singing).

Figure 6:
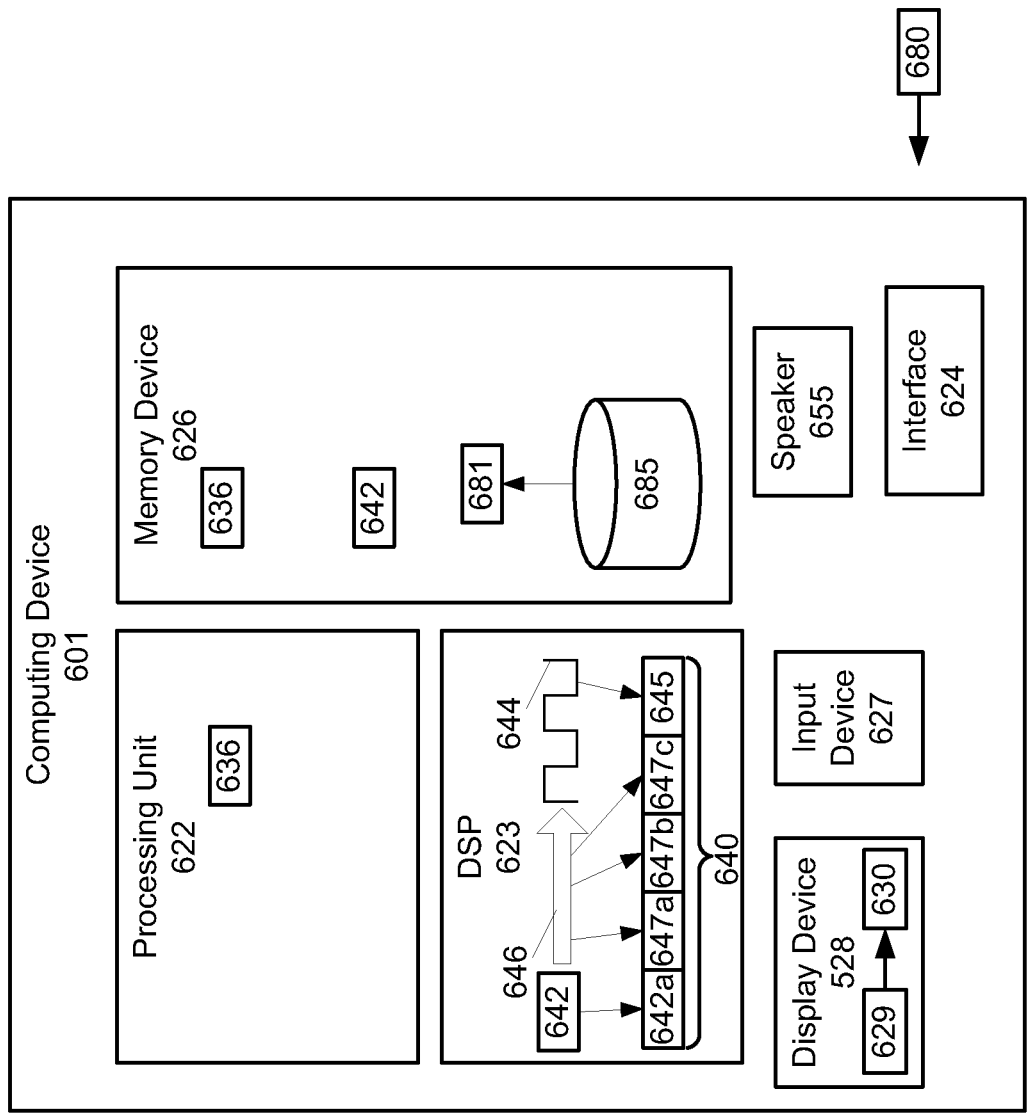

Attention is now directed to FIG. 6, which depicts a computing device 601 (also referred to as device 601), substantially similar to device 101, with like elements having like numbers, however preceded by a "6" rather than a "1": for example, DSP 623 is similar to DSP 123. However in these implementations, computing device 601 also comprises a speaker 655 similar to speaker 155; hence computing device 601 also comprises a playback device. For example, in these implementations computing device 601 can comprise a portable computing device (e.g. a PDA, smartphone, and the like), enabled to dynamically generate audio notification file 640 when a notification 680 is received at device 601. In these implementations, audio notification file 640 is not initially stored in memory device 626, but is automatically generated when notification 680 is received. In other words, method 200 is triggered in device 601 upon receipt of notification 680, such that a first audio file 642 is selected and designated as first section 642a of audio notification file 640, and an end state 644 is selected as a final section 645 of audio notification file 640, with intermediate sections 647a, 647b, 647c (or any suitable number of intermediated sections 647) of audio notification file 640 generated during morphing 646. In some implementations, audio notification file 640 can then be stored in memory device 626 for later playback (e.g. when another notification is received), or regenerated with each notification received.

In these implementations, audio notification file 640 is dynamically generated when a phone call, e-mail, message, text message, or the like, is received at device 601.

Alternatively, audio notification file 640 can be dynamically generated when a notification 681 comprising an alarm (e.g. a notification for a meeting, a notification to wake up etc.) is generated at device 601 as stored in a calendar database 685.

Figure 7:
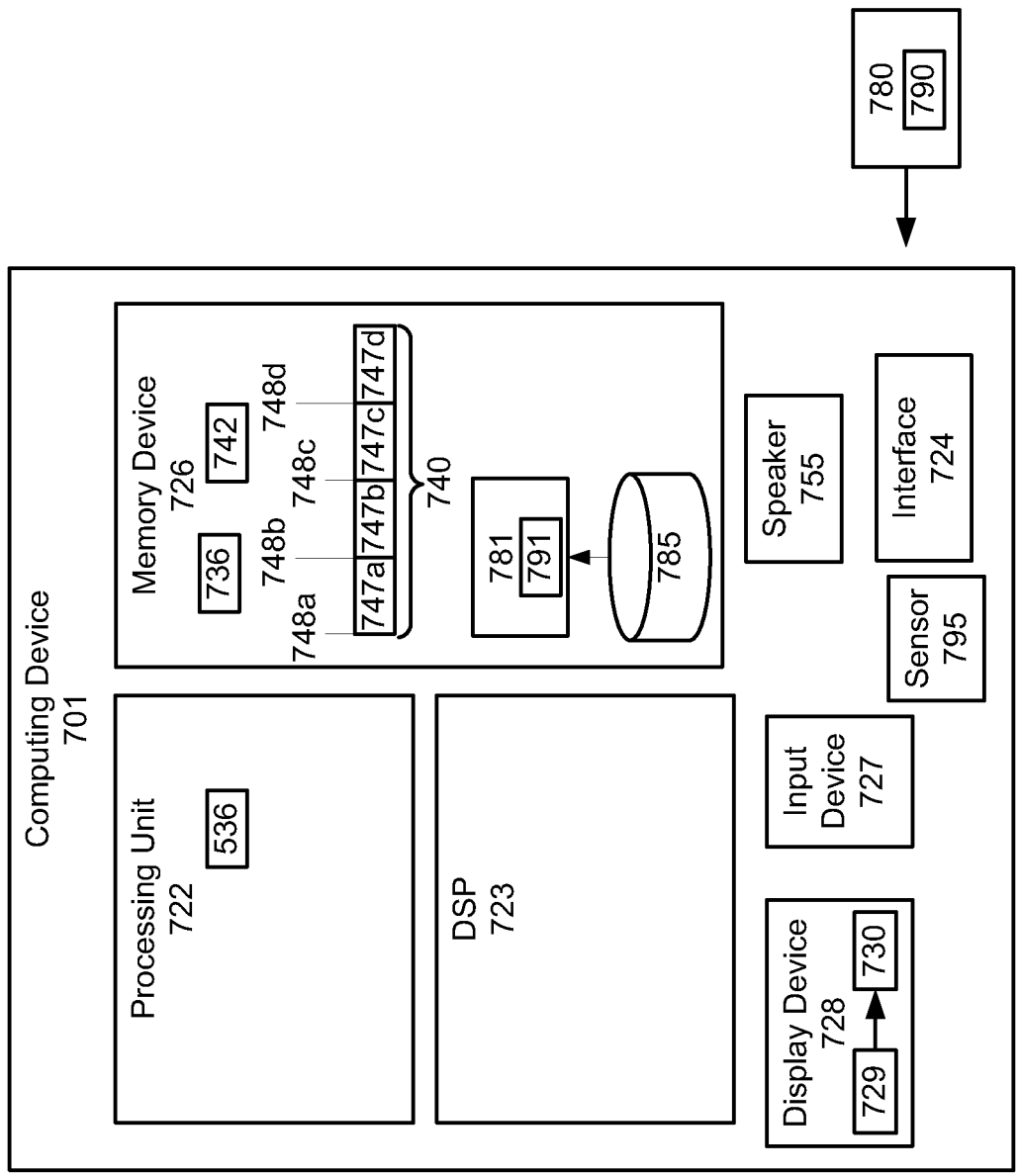
FIG. 7 depicts a block diagram of a computing device for using markers in an audio notification file to provide a notification, according to non-limiting implementations.

Attention is now directed to FIG. 7, which depicts a computing device 701 (also referred to as device 701), substantially similar to device 601, with like elements having like numbers, however preceded by a "7" rather than a "6": for example, DSP 723 is similar to DSP 623. However in these implementations, audio notification file 740 is stored in memory 726 and comprises a first section 747a, two intermediate sections 747b, 747c, and a final section 747d (collectively referred to as sections 747 and generically as a section 747). Audio notification file 740 further comprise markers 748a, 748b, 748c, 748d (collectively referred to as markers 748 and generically as a marker 748), associated with a beginning of a respective section 747. Audio notification file 740 can be generated by a remote computing device, such as device 101, and/or by a device 701. Furthermore, markers 748 can be added to audio notification file 740 as audio notification file 740 is being generated and/or upon analysis of audio notification file 740 to determine sections 747 and/or manually. In general, it is appreciated that each section 747, as denoted by each marker 748, is associated with at least one of a given level of urgency and a given mental state (e.g. louder section vs. softer sections, sections having smooth waveforms vs. sections having abrupt waveforms, and the like).

Figure 8:
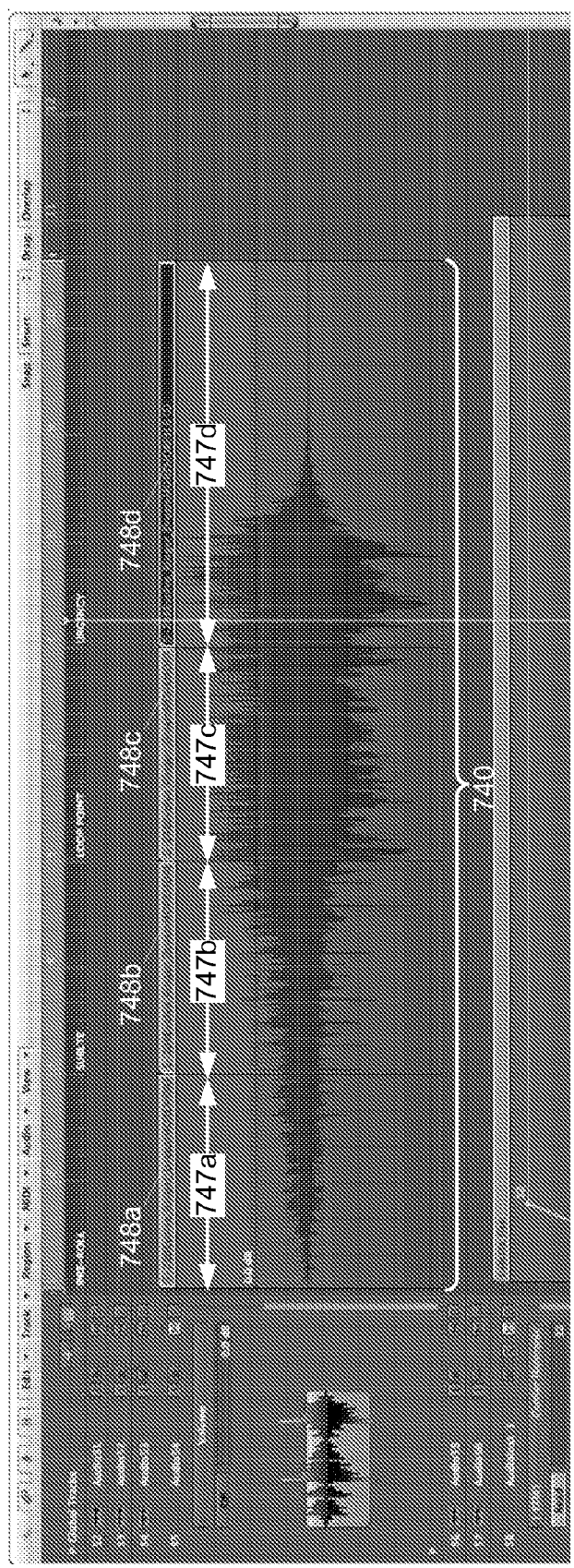
FIG. 8 depicts a visual representation of an audio notification file including markers marking different sections of the audio notification file, according to non-limiting implementations.

A non-limiting example of audio notification file 740 is depicted in FIG. 8, with sections 747 and markers 748 depicted therein. It is appreciated from FIG. 8 that each section 747 of audio notification file 740 comprises a waveform associated with a different level of urgency, as indicated by markers 748, including but not limited to a "pre-roll" section, a "subtle" section, a "loop point" section, and an "urgency" section, with the urgency section being the most urgent. The "urgency" section, corresponding to section 747d, comprises a section indicating a high level of urgency, while each previous section is associated with decreasing levels of urgency.

Furthermore, sections 747 of audio notification file 740 depicted in FIG. 8 can comprise at least one of: separate audio files triggered in series playback; dynamic resultants of DSP treatment to a single audio file; and a resultant output of any number of vertical layers of audio files mixed together and controlled in any suitable manner as described above. Furthermore, the start of playback for the various audio files integrated in audio notification file 740 can overlap or contain delays between the various audio files: they need not be seamless or immediately sequential.

In any event, returning to FIG. 7, each of notification 780, 781 can comprise a respective indication of urgency 790, 791. For example, if a caller, at a remote computing device used to call and/or send a message to device 701, wishes to make a call and/or send a message to device 701 urgent, a selection can be made using a user interface to indicate that the call/message is urgent, and the remote computing device will, in response, associate indicator 790 with the call, which is then delivered to device 701 in notification 780. When notification 780 is received, indicator 790 is extracted using processing unit 722, and an appropriate section 747 or sections 747 are chosen from audio notification file 740 to play in response to receiving notification 780. For example, when indicator 790 indicates that notification 780 is urgent, then section 747d can be selected to play in a loop until the call is responded to via input device 727. The selection of sections 747 can be based on markers 748.

Figure 9:
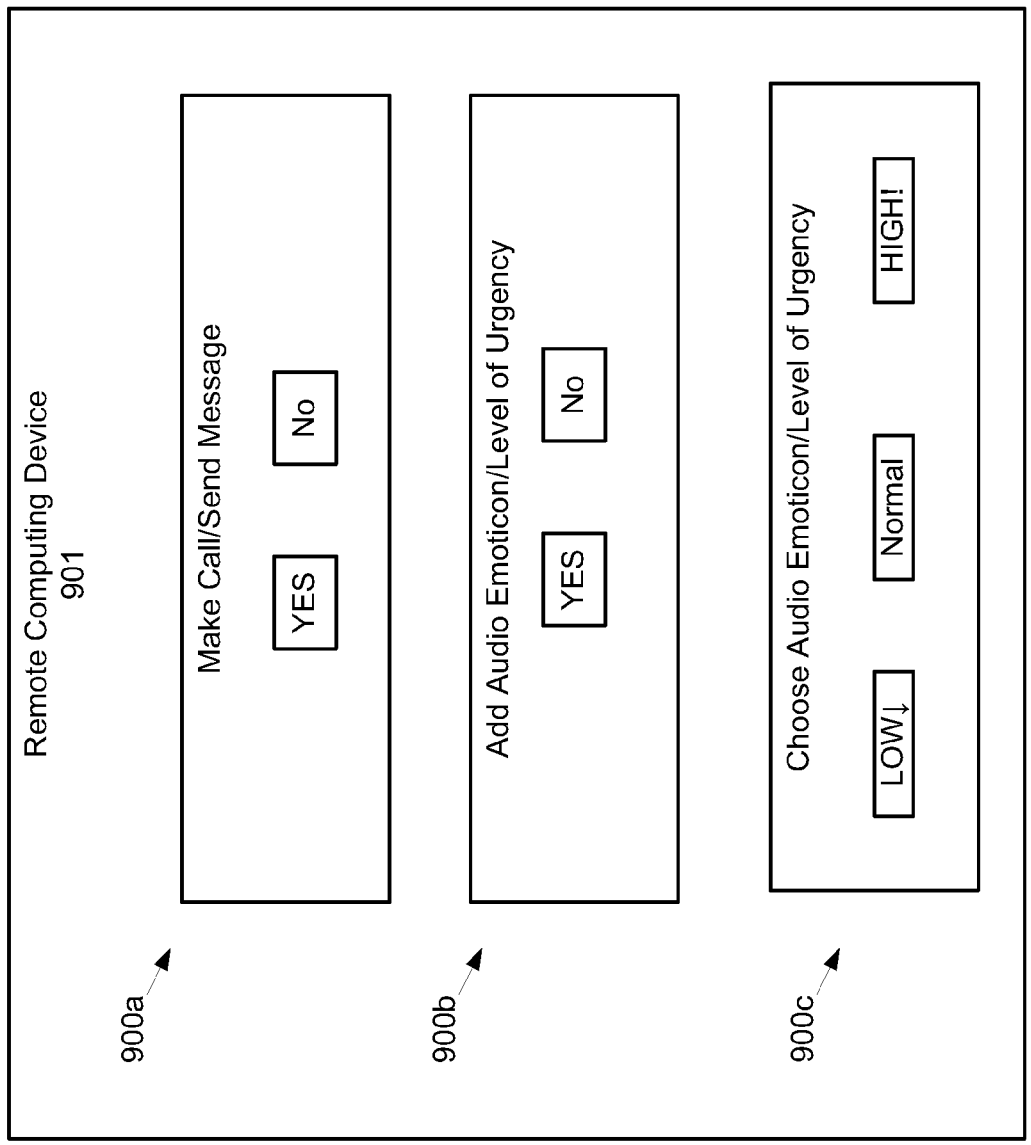
FIG. 9 depicts graphical user interfaces for adding an indicator of urgency to a call or a message at an originating computing device, according to non-limiting implementations.

For example, attention is now directed to FIG. 9, which depicts graphic user interfaces (GUIs) 900a, 900b, 900c at a remote computing device 901 (also referred to device 901) enabled to generate notification 780 and indicator 790, and to transmit notification 780 and indicator 790 to device 701. While not depicted, it is appreciated that device 901 comprises suitable processing unit(s), input device(s), display devices(s), communication interface(s), memory device(s), etc. In any event, when a call/message is to be made, in depicted non-limiting implementations, GUI 900a can be provided at a display device to indicate whether the call is to be made. Presuming that "Yes" is selected, prior to initiating the call/sending the message, GUI 900*b* is provided to indicate whether an "audio emoticon"/level of urgency is to be associated with the call/message. If so, GUI 900*c* is provided where the audio emoticon/level of urgency is selected ("Low ↓", "Normal", or "High!", or any other appropriate levels of urgency and/or emoticons). Indicator 790 is then generated which comprises the level of urgency. Hence, when indicator 790 is processed at device 701, an audio notifier can be provided appropriate to the urgency of the call.

Similarly, an indication 791 of urgency of a notification 781 associated with an alarm can be processed by processing unit 722 to determine which section 747 or sections 747 of audio notification file 740 to play.

In some implementations, the level of urgency that is to be provided in an audio notification can be determined from the context of device 701. For example, a context can be based on calendar database 785 (e.g. whether or not a current time period comprises a calendar event; the type of calendar event can also be indicated). For example, if notification 780 arrives during a calendar event designated as high priority, it is appreciated that a loud and/or jarring audio notification can be inappropriate. In these implementations, "subtle" section 747*b* can be chosen from audio notification file 740.

Similarly, a context of device 740 can also be determined from an optional sensor 795, which is enabled to determine an environment of device 701, for example whether device 701 is in a loud environment and hence needs a loud audio notification, whether device 701 is in an enclosed environment (such as a box), and hence needs a loud audio notification, or the like. Any suitable sensor 795 is within the scope of present implementations. In any event, the appropriate section 747 or sections 747 can again be chosen from audio notification file 740 and played in a loop until the call or alarm is responded to.

It is further appreciated that in each of these implementations, DSP 723 can be used to generate another audio notification file from sections 747 appropriate to the context of device 701 and/or urgency of notifications 780, 781, similar to that described above. In other words, sections 747 of audio notification file 740 can themselves be used as first audio files and final audio files in the dynamic generation of new audio notification files.

Furthermore, such generation of new audio notification files using DSP 723 from sections of existing audio files stored at device 701 can occur in the absence of context data or urgency data.

In some implementations, audio notification file 140 can comprise a plurality of audio files appended together to form a sentence, for example the spoken words "hello" and "your" and "phone" and is and "ringing". In these implementations, each of the audio files in audio notification file 140 can be denoted by markers, similar to markers 748. Hence, when notifications 780 (or notification 781) is received, a subset of audio notification file 140 can be chosen using the markers to form a sentence of different urgency, such as "phone" and "ringing", based on the level of urgency in indication 790. Alternatively, audio notification file 140, or a subset thereof, can be combined with other audio files to provide a different level of urgency: e.g. in the case of more urgency, at least one prefix audio file, such as a file comprising the spoken words "HEY YOU" prior to the full sentence. In yet further implementations, a subset of audio notification file 140 can be repeated, such as repeating "hello" in subsequent attempts to notify a user. Such an evolving alert can include morphing and appending based on urgency. Hence, in these implementations, audio notification file 140 is appreciated to be part of a library of resources, from which suitable subsets can be selected to reduce the processing time in providing a dynamic alert, rather than separately generating each part of an alert.

Figure 10:
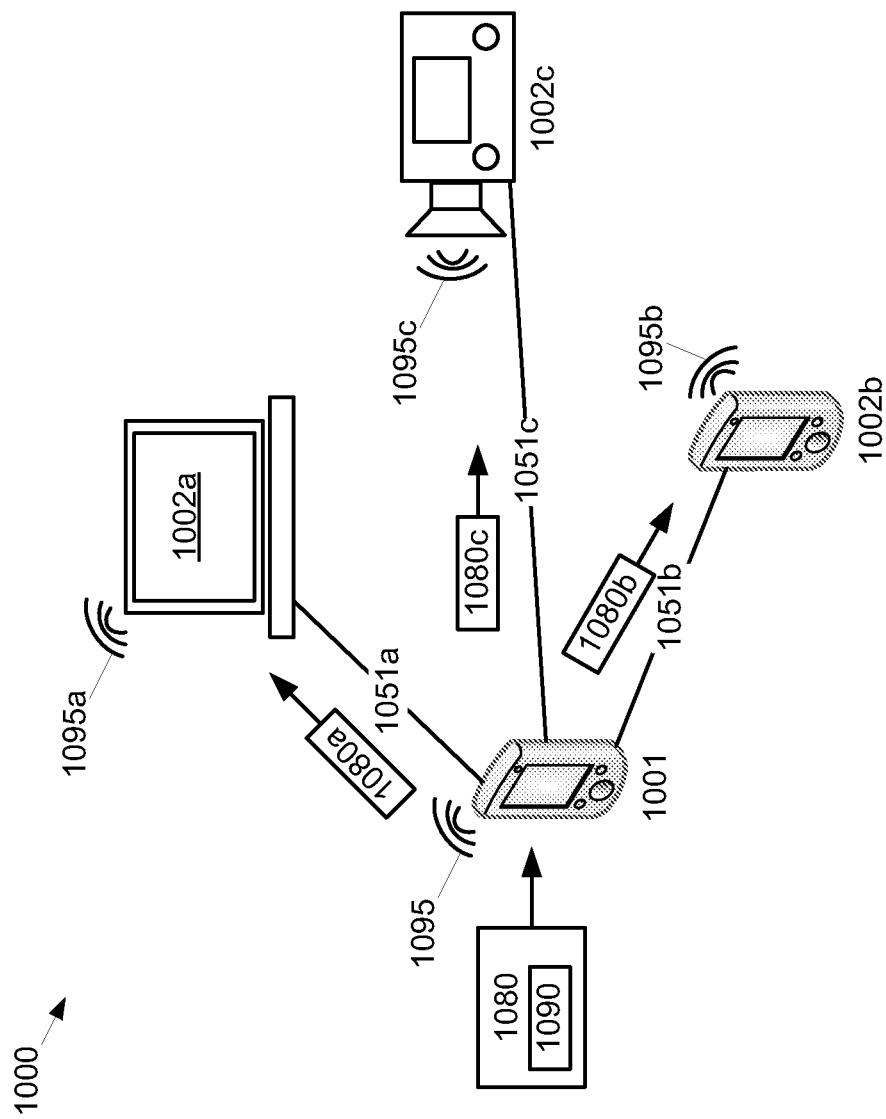
FIG. 10 depicts a block diagram of a system for providing notifications for a call or message intended for a first device at devices in communication with the first device, according to non-limiting implementations.

Attention is now directed to FIG. 10, which depicts a system 1000 comprising a computing device 1001, similar to device 701, and devices 1002*a*, 1002*b*, 1002*c* (collectively devices 1002, and generically a device 1002), each device 1002 enabled to generate an alert. For example, device 1002*a* can comprise a personal computer which can generate alerts either via speakers or a display device; device 1002*b* can comprise a mobile electronic device which can generate alerts either via speakers, a display device or a vibration motor; and device 1002*c* can comprise a radio which can generate alerts via speakers. It is appreciated that while three devices 1002 are depicted in FIG. 10, system 1000 can comprise any suitable number of devices 1002. Furthermore each device 1002 can comprise any other suitable device, including but not limited to a car radio, a stereo system, a boom box, a television, a telephonic device, or the like.

Device 1001 is furthermore in communication with each device 1002, for example via a near field communication (NFC) network, such as Bluetooth™ Wi-Fi or the like, in an un-depicted provisioning process; hence, device 1001 can communicate with each device 1002 via respective link 1051*a*, 1051*b*, 1051*c*, which are wireless or wireless as desired. In some of these implementations, device 1001 is paired with each device 1002. Furthermore, device 1001 is enabled to send and receive calls/messages, either wirelessly or wired as desired, from remote computing devices, which can be similar to device 901, via a communications network (not depicted). The call/message can be announced via a notification 1080, which can be similar to notification 780, and can optionally comprise an indication 1090 similar to indication 790.

In any event, once device 1001 receives notification 1080, device 1001 will provide a suitable notifier 1095, for example an audio notifier, which can be based on indication 1090 as described above. When, after a given period of time, no action is taken at device 1001 (e.g. a call is not answered, a message is not viewed and/or the like), device 1001 will transmit respective notification 1080*a*, 1080*b*, 1080*c* to devices 1002*a*, 1002*b*, 1002*c*, to trigger them to provide respective notifiers 1095*a*, 1095*b*, 1095*c*, for example audio, visual, or vibratory notifiers as desired. Notifiers 1095*a*, 1095*b*, 1095*c* can be provided until an action is taken at device 1001 to respond to the call/message, at which point device 1001 can transmit a cease notification message (not depicted) to each device 1001. Alternatively, a user of each device 1002 can manually stop respective device 1002 from providing the notifier 1095. Hence, a call/message is not answered at device 1001, devices 1002 will further alert the user of device 1001 of the call/message until the call/message is responded to, which can be done according to the urgency of the call/message as provided in indication 1090.

In some implementations, notifications 1080*a*, 1080*b*, 1080*c* can be transmitted substantially simultaneously, whereas in other implementations, each notification 1080*a*, 1080*b*, 1080*c* can be transmitted after a suitable delay in between and/or until the call/message is responded to. In yet further implementations, a first one of the notifications 1080*a*, 1080*b*, 1080*c* is transmitted to the device 1002 which is closest to device 1001, which can be determined via respective location devices (e.g. GPS, triangulation devices and methods, and the like).

Those skilled in the art will appreciate that in some implementations, the functionality of devices 101, 150, 601, 701, 901, 1001, 1002 can be implemented using pre-programmed hardware or firmware elements (e.g., application specific integrated circuits (ASICs), electrically erasable programmable read-only memories (EEPROMs), etc.), or other related components. In other implementations, the functionality of devices 101, 150, 601, 701, 901, 1001, 1002 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but otherwise reserves all copyrights whatsoever.

Persons skilled in the art will appreciate that there are yet more alternative implementations and modifications possible for implementing the implementations, and that the above implementations and examples are only illustrations of one or more implementations. The scope, therefore, is only to be limited by the claims appended hereto.

What is claimed is:

1. A method for generating an audio notification file for a computing device comprising a processing unit interconnected with a memory and a speaker, said method comprising:
    selecting a first audio file associated with a first mental state as a first section of said audio notification file, said audio notification file enabled for storage in said memory, said audio notification file further enabled for processing by said processing unit to control said speaker;
    determining a final state of said audio notification file, said final state designated as a final section of said audio notification file, said final state associated with a second mental state;
    generating at least one intermediate section of said audio notification file, between said first section and said second section, by morphing said first audio file to said final state by processing said first audio file using a digital signal processor (DSP);
    adding markers to said audio notification file to mark transitions between each said section of said audio notification file, wherein each of said sections are associated with a given level of urgency; and
    storing said audio notification file in said memory of said computing device;
    determining that at least one of said sections is associated with a level of urgency of a given notification;
    selecting said at least one of said sections based on said markers; and,
    playing said at least one of said sections associated with said level of urgency in response to determining that said given notification is to be provided.

2. The method of claim 1, wherein said generating said at least one intermediate section of said audio notification file comprises:
    processing said first audio file using said DSP until said first audio file has morphed into said final state; and, as said first audio file is processed using said DSP,
    storing intermediate states of said first audio file in said audio notification file as said at least one intermediate section such that a transition from said first section to said final section in said audio notification file is audibly smooth when said audio notification file is played.

3. The method of claim 1, wherein said determining said final state of said audio notification file comprises selecting a second audio file associated with said second mental state as said final state, and said generating said at least one intermediate section of said audio notification file comprises:
    processing said first audio file and said second audio file to cause said first audio file to morph into said second audio file using said DSP; and, as said first audio file and said second audio file are processed using said DSP,
    storing intermediate states of said first audio file morphing into said second audio file in said audio notification file as said at least one intermediate section such that a transition from said first section to said final section in said audio notification file is audibly smooth when said audio notification file is played.

4. The method of claim 3, further comprising:
    selecting at least a third audio file associated with an intermediate mental state,
    wherein said processing said first audio file and said second audio file to cause said first audio file to morph into said second audio file comprises processing at least said third audio file to cause said first audio file to first morph into said third audio file before morphing into said second audio file, and
    wherein said storing said intermediate states comprises: storing first intermediate states of said first audio file morphing into said third audio file; and storing second intermediate states of said third audio file morphing into said second audio file.

5. The method of claim 1, further comprising storing said audio notification file in said memory of said computing device.

6. The method of claim 5, further comprising determining, at said computing device, that a notification is to be provided and in response processing said audio notification file at said processing unit to control said speaker to output sound based on said audio notification file.

7. The method of claim 1, wherein said selecting said first audio file, said storing said first audio file, said determining a final state of said audio notification file, and said generating said at least one intermediate section of said audio notification file all occur automatically at said processing unit of said computing device when said processing unit determines that a notification is to be provided by playing said audio notification file.

8. The method of claim 1, further comprising determining said level of urgency based on a context of said computing device via at least one of a calendar database associated with said computing device, a location sensing device, and at least one sensor.

9. The method of claim 1, further comprising receiving a message from a second computing device, said message comprising indicating said level of urgency, and determining that said given notification is to be provided in response to said receiving.

10. The method of claim 1, wherein said first mental state comprises a sleeping state.

11. The method of claim 1, wherein said second mental state comprises a waking state.

12. The method of claim 1, wherein said first audio file comprises at least one of a polyphonic file and a music file and said final state comprises a target wave state.

13. The method of claim 1, further comprising mixing at least one additional audio file into said audio notification file by at least one of:
- cross-fading said at least one additional audio file with at least one of said first audio file and said final state;
- mixing said at least one additional audio file for playback in parallel with at least one of said first audio file and said final state;
- adding said at least one additional audio file for playback in series with at least one of said first audio file and said final state;
- appending said at least one additional audio file to at least one of said first audio file and said final state; and,
- mixing said at least one additional audio file to said audio notification file for staggered playback with at least one of said first audio file and said final state.

14. The method of claim 1, wherein at least one of said first audio file and said final state are selected from a library associated with a playback device upon which said audio notification file is to be played.

15. The method of claim 1, wherein said morphing said first audio file to said final state comprises at least one of:
- morphing said first audio file to said final state over a given period of time;
- evolving said first audio file to said final state;
- increasing a first set of frequencies in said first audio file over said given period of time;
- decreasing a second set of frequencies in said first audio file over said given period of time;
- changing a tone of a third set of frequencies in said first audio file over said given period of time;
- changing an urgency level in a fourth set of frequencies in said first audio file over said given period of time;
- changing a speed of said first audio file over said given period of time; and,
- changing a first instrument associated with said first audio file to a second instrument over said given period of time.

16. A computing device for generating an audio notification file comprising:
- a processing unit interconnected with a memory said processing unit enabled to:
  - select a first audio file associated with a first mental state as a first section of said audio notification file, said audio notification file enabled for storage in a memory of playback device, said audio notification file further enabled for processing by said play back device to control a speaker;
  - determine a final state of said audio notification file, said final state designated as a final section of said audio notification file, said final state associated with a second mental state;
  - generate at least one intermediate section of said audio notification file, between said first section and said second section, by morphing said first audio file to said final state by processing said first audio file using a digital signal processor (DSP);
  - add markers to said audio notification file to mark transitions between each said section of said audio notification file, wherein each of said sections are associated with a given level of urgency;
  - store said audio notification file in said memory of said computing device;
  - determine that at least one of said sections is associated with a level of urgency of a given notification;
  - select said at least one of said sections based on said markers; and,
  - play said at least one of said sections associated with said level of urgency in response to determining that said given notification is to be provided.

17. The computing device of claim 16, wherein said processing unit is further enabled to generate said at least one intermediate section of said audio notification file by:
- processing said first audio file using said DSP until said first audio file has morphed into said final state; and, as said first audio file is processed using said DSP,
- storing intermediate states of said first audio file in said audio notification file as said at least one intermediate section such that a transition from said first section to said final section in said audio notification file is audibly smooth when said audio notification file is played.

18. The computing device of claim 16, wherein said processing unit is further enabled to determine said final state of said audio notification file by selecting a second audio file associated with said second mental state as said final state, and wherein said processing unit is further enabled to generate said at least one intermediate section of said audio notification file by:
- processing said first audio file and said second audio file to cause said first audio file to morph into said second audio file using said DSP; and, as said first audio file and said second audio file are processed using said DSP,
- storing intermediate states of said first audio file morphing into said second audio file in said audio notification file as said at least one intermediate section such that a transition from said first section to said final section in said audio notification file is audibly smooth when said audio notification file is played.

19. The computing device of claim 3, wherein said processing unit is further enabled to:
- select at least a third audio file associated with an intermediate mental state,
- wherein said processing unit is further enabled to process said first audio file and said second audio file to cause said first audio file to morph into said second audio file by processing at least said third audio file to cause said first audio file to first morph into said third audio file before morphing into said second audio file, and
- wherein said processing unit is further enabled to store said intermediate states by: storing first intermediate states of said first audio file morphing into said third audio file; and storing second intermediate states of said third audio file morphing into said second audio file.

20. The computing device of claim 16, wherein said processing unit is further enabled to store said audio notification file in said memory of said computing device.

21. The computing device of claim 20, further comprising said playback device and wherein said processing unit is further enabled to determine that a notification is to be provided and in response processing said audio notification file at said processing unit to control said speaker to output sound based on said audio notification file.

22. The computing device of claim 16, further comprising said playback device, and wherein said processing unit is further enabled to select said first audio file, store said first audio file, determine a final state of said audio notification file, and generate said at least one intermediate section of said audio notification file automatically at said processing unit of said computing device when said processing unit determines that a notification is to be provided by playing said audio notification file.

23. The computing device of claim 16, wherein said processing unit is further enabled to determine said level of urgency based on a context of said computing device via at least one of a calendar database associated with said computing device, a location sensing device, and at least one sensor.

24. The computing device of claim 16, wherein said processing unit is further enabled to receive a message from a second computing device, said message comprising indicating said level of urgency, and determine that said given notification is to be provided in response to said receiving.

25. The computing device of claim 16, wherein said first mental state comprises a sleeping state.

26. The computing device of claim 16, wherein said second mental state comprises a waking state.

27. The computing device of claim 16, wherein said first audio file comprises at least one of a polyphonic file and a music file and said final state comprises a target wave state.

28. The computing device of claim 16, wherein said processing unit is further enabled to mix at least one additional audio file into said audio notification file by at least one of:
  cross-fading said at least one additional audio file with at least one of said first audio file and said final state;
  mixing said at least one additional audio file for playback in parallel with at least one of said first audio file and said final state;
  adding said at least one additional audio file for playback in series with at least one of said first audio file and said final state;
  appending said at least one additional audio file to at least one of said first audio file and said final state; and,
  mixing said at least one additional audio file to said audio notification file for staggered playback with at least one of said first audio file and said final state.

29. The computing device of claim 16, wherein at least one of said first audio file and said final state are selected from a library associated with said playback device.

30. The computing device of claim 16, wherein said processing unit is further enabled to morph said first audio file to said final state by at least one of:
  morphing said first audio file to said final state over a given period of time;
  evolving said first audio file to said final state;
  increasing a first set of frequencies in said first audio file over said given period of time;
  decreasing a second set of frequencies in said first audio file over said given period of time;
  changing a tone of a third set of frequencies in said first audio file over said given period of time;
  changing an urgency level in a fourth set of frequencies in said first audio file over said given period of time;
  changing a speed of said first audio file over said given period of time; and,
  changing a first instrument associated with said first audio file to a second instrument over said given period of time.

31. A computer program product, comprising a computer usable medium having a computer readable program code adapted to be executed to implement a method for generating an audio notification file for a computing device comprising a processing unit interconnected with a memory and a speaker, said method comprising:
  selecting a first audio file associated with a first mental state as a first section of said audio notification file, said audio notification file enabled for storage in said memory, said audio notification file further enabled for processing by said processing unit to control said speaker;
  determining a final state of said audio notification file, said final state designated as a final section of said audio notification file, said final state associated with a second mental state;
  generating at least one intermediate section of said audio notification file, between said first section and said second section, by morphing said first audio file to said final state by processing said first audio file using a digital signal processor (DSP);
  adding markers to said audio notification file to mark transitions between each said section of said audio notification file, wherein each of said sections are associated with a given level of urgency; and
  storing said audio notification file in said memory of said computing device;
  determining that at least one of said sections is associated with a level of urgency of a given notification;
  selecting said at least one of said sections based on said markers; and
  playing said at least one of said sections associated with said level of urgency in response to determining that said given notification is to be provided.

\* \* \* \* \*